(12) United States Patent
Kawamura et al.

(10) Patent No.: US 11,871,021 B2
(45) Date of Patent: Jan. 9, 2024

(54) MOVING PICTURE DECODING DEVICE, MOVING PICTURE DECODING METHOD, AND PROGRAM OBTAINING CHROMINANCE VALUES FROM CORRESPONDING LUMINANCE VALUES

(71) Applicant: KDDI CORPORATION, Tokyo (JP)

(72) Inventors: Kei Kawamura, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 17/873,669

(22) Filed: Jul. 26, 2022

(65) Prior Publication Data

US 2022/0368931 A1 Nov. 17, 2022

Related U.S. Application Data

(63) Continuation of application No. 16/981,771, filed as application No. PCT/JP2019/047852 on Dec. 6, 2019, now Pat. No. 11,438,615.

(30) Foreign Application Priority Data

Dec. 27, 2018 (JP) ................................ 2018-245882

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/132* (2014.11); *H04N 19/176* (2014.11); *H04N 19/186* (2014.11)

(58) Field of Classification Search
CPC .... H04N 19/44; H04N 19/105; H04N 19/132; H04N 19/176; H04N 19/186; H04N 19/593
(Continued)

(56) References Cited

U.S. PATENT DOCUMENTS

2016/0134869 A1 5/2016 Ikai
2018/0109790 A1 4/2018 Ikai

FOREIGN PATENT DOCUMENTS

JP 2014-195142 A 10/2014
JP 2018-174567 A 11/2018

OTHER PUBLICATIONS

International Search Report issued in corresponding International Patent Application No. PCT/JP2019/047852 dated Feb. 18, 2020, with English translation.
(Continued)

*Primary Examiner* — Marnie A Matt
(74) *Attorney, Agent, or Firm* — Troutman Pepper Hamilton Sanders LLP

(57) ABSTRACT

A decoding device includes a transformer sets a decoded luminance component of a prediction target block to the same number of samples as that of the chrominance component corresponding to the decoded luminance component of the prediction target block and generates a luminance reference signal. A specificator specifies luminance pixels having minimum and maximum pixel values of the decoded luminance component adjacent to the decoded luminance component of the prediction target block, respectively, outputs luminance pixel values obtained from specified luminance pixels, and outputs chrominance pixel values from pigment pixels corresponding to the luminance pixels. A derivator derives a linear prediction parameter from the two pixel values and a linear prediction model. A chrominance linear predictor obtains chrominance prediction signal
(Continued)

applying the linear prediction model based on the linear prediction parameter to the luminance reference signal. The chrominance prediction and residual signals are summed to generate a reconstructed chrominance signal.

3 Claims, 5 Drawing Sheets

(51) Int. Cl.
    *H04N 19/132*     (2014.01)
    *H04N 19/176*     (2014.01)
    *H04N 19/186*     (2014.01)

(58) Field of Classification Search
    USPC .................................................. 375/240.25
    See application file for complete search history.

(56) References Cited

OTHER PUBLICATIONS

Bross, B., et al., "Verstaile Video Coding (Draft 3)" :Joint Video Experts Team (JVET) of ITU-T SG 16 WP 3 and ISO/IEC JTC 1/SC 29/WG 11, 8 pages (Oct. 3-12, 2018) cited in ISR submitted herewith, cited in Specification.

Ikawamura, K., et al. "Bit-width reduction of multiplier in CCLM derivation and prediction" Joint Video Experts Team (JVET) of ITU-T SG 16 WP 3 and ISO/IEC JJTC 1/SC 29 WG/11, 5 pages (Jan. 9-18, 2019) cited in ISR submitted herewith.

ITU-T H.265 v5 "Series H: Audiovisual and Multimedia Systems Infrastructure of audiovisual services—Coding of moving video High Efficiency Video Coding" International Telecommunication Union, 692 pages (Feb. 2018) cited in Specification.

European Search Report for European Application No. 19906288.6 dated Sep. 6, 2022.

Wiegand (Fraunhofer) T et al 'WD3: Working Draft 3 of High-Efficiency Video Coding', 5. JCT-VC Meeting; Mar. 16, 2011-Mar. 23, 2011; Geneva; (Joint Collaborative Team on Video Coding of ISO/IEC JTC1/SC29/ WG11 and ITU-T SG.16 ), No. JCTVC-E603 [retrieved Jun. 27, 2011], XP030227882, Retrieved from the Internet: URL:http://phenix.int-evry.fr/jct/doc_end_user/documents/5_Geneva/wg11/JCTVC-E603-v8.zip JGTVC-E603_d8.doc.

Yasugi Y et al 'Non-CE3: CCLM table reduction and bit range control', 13. JVET , Meeting; Jan. 9, 2019-Jan. 18, 2019; Marrakech; (The Joint Video Exploration Team of ISO/IEC JTC1/SC29/ WG11 and ITU-T SG.16 ), No. JVET-M0064 [retrieved on Jan. 3, 2019] XP030200340, Retrieved from the Internet: URL:http://phenix.int-evry.fr/jvet/doc_end user/documents/13_Marrakech/wg11/JVET-M0064-vl.zip JVET-M0064.docx.

MOVING PICTURE DECODING DEVICE, MOVING PICTURE DECODING METHOD, AND PROGRAM OBTAINING CHROMINANCE VALUES FROM CORRESPONDING LUMINANCE VALUES

CROSS REFERENCE TO RELATED APPLICATIONS

This is a continuation application of U.S. application Ser. No. 16/981,771 filed Sep. 17, 2020 which is a U.S. National Phase Application under 35 U.S.C. § 371 of International Patent Application No. PCT/JP2019/047852, filed Dec. 6, 2019, which claims priority of Japanese Patent Application No. 2018-245882, filed Dec. 27, 2018. The entire contents of which are hereby incorporated by reference.

FIELD OF THE INVENTION

The present invention relates to a moving picture decoding device, a moving picture decoding method, and a program.

BACKGROUND

Conventionally, a moving picture encoding method using intra prediction (intra-frame prediction) or inter prediction (inter-frame prediction), transform/quantization of a prediction residual signal, and entropy encoding has been proposed (for example, ITU-T H.265 High Efficiency Video Coding).

A moving picture encoding device corresponding to such a moving picture encoding method firstly divides an input image into a plurality of blocks, secondly generates a level value by performing transform and quantization on a residual signal that is a difference between an input image and an intra prediction image or an inter prediction image in divided block units (one or more transform units), and thirdly generates coded data by entropy encoding the generated level value together with side information (related information such as a prediction mode and a motion vector necessary for reconstructing a pixel value).

On the other hand, a moving picture decoding device corresponding to a moving picture decoding method obtains an output image from coded data by a procedure reverse to the procedure performed by the moving picture encoding device.

Specifically, such a moving picture decoding device performs inverse quantization and inverse transform on the level value obtained from the encoded data to generate a residual signal, and adds the residual signal to the intra prediction image or the inter prediction image to generate a locally decoded image before filtering, uses the locally decoded image before filtering for intra prediction and at the same time, applies an in-loop filter (for example, a deblocking filter) to generate a locally decoded image after filtering, and accumulates the locally decoded image after filtering in a frame buffer. The frame buffer appropriately supplies the locally decoded image after filtering to inter prediction.

Note that processing of obtaining the side information and the level value from the encoded data is referred to parse processing, and reconstructing a pixel value using the side information and level value is referred to decoding processing.

Here, a chrominance intra prediction method among the intra predictions in the next-generation moving picture encoding method VVC described in Versatile Video Coding (Draft 3) will be described.

The chrominance intra prediction method includes a cross-component linear model (CCLM) that linearly predicts a chrominance component from a reconstructed luminance component, in addition to an intra-color component prediction method similar to a luminance intra prediction method. Since the luminance component and the chrominance component have different numbers of samples in the 4:2:0 color format, a luminance pixel corresponding to a chrominance pixel is derived by smoothing as shown in FIG. 6.

Here, a 6-tap filter used for smoothing is as follows.

$$pDsY[x][y]=(pY[2*x-1][2*y]+pY[2*x-1][2*y+1]+ \\ 2*pY[2*x][2*y]+2*pY[2*x][2*y+1]+pY[2*x+1] \\ [2*y]+pY[2*x+1][2*y+1]+4)>>3 \qquad \text{Equation 1}$$

The linear prediction parameters a and b used for the CCLM method are derived as follows by applying a linear prediction model that performs a linear transform from luminance to chrominance for the pixel values of the decoded luminance and chrominance adjacent to a prediction target block, using the minimum and maximum pixels of luminance. Here, the parameter k is a constant.

$$\text{diff}=(\max Y-\min Y)>>\text{shift}$$

$$a=((\max C-\min C)*\text{LUT}(\text{diff}))>>\text{shift}$$

$$b=\min C-((a*\min Y)>>k) \qquad \text{Equation 2}$$

Then, a chrominance component in the prediction target block is predicted from the luminance component based on the following linear prediction model and the derived linear prediction parameters a and b.

$$\text{predSamples}[x][y]=\text{Clip1}C(((pDsY[x][y]*a)>>k)+b) \qquad \text{Equation 3}$$

Patent Literature 1: JP-A-2014-195142

SUMMARY

However, the next-generation moving picture encoding method VVC has a problem that a calculation complexity in deriving prediction coefficients is high.

Specifically, the next-generation moving picture encoding method VVC has a problem that the number of bits required for the operation is larger than the number of bits of other processing blocks because a look-up table constituting a part of the derivation has high accuracy.

In addition, the next-generation moving picture encoding method VVC has a problem that the obtained predicted value may exceed the range of the input pixel value because an absolute value of the prediction coefficient is not limited.

Furthermore, the next-generation moving picture encoding method VVC has a problem that a smoothing operation is performed on all pixels to be compared even though only two pixels are finally used when a linear model is derived.

Therefore, the present invention has been made in view of the above-described problems, and an object of the present invention is to provide a moving picture decoding device, a moving picture encoding device, a moving picture processing system, a moving picture decoding method, and a program capable of reducing a precision (number of bits) of a lookup table and determining the maximum value of an absolute value of a prediction coefficient to reduce a required calculation precision (number of bits required for calculation) to the same degree as the calculation precision of an interpolation filter.

In addition, an object of the present invention is to provide a moving picture decoding device, a moving picture encoding device, a moving picture processing system, a moving picture decoding method, and a program capable of determining pixels whose luminance becomes the minimum value and the maximum value without smoothing and completely reducing a smoothing operation even though the number of comparisons is doubled.

The first aspect of the present invention is summarized as a moving picture decoding device configured to decode encoded data, the moving picture decoding device including: a decoding unit configured to decode the encoded data to obtain a chrominance residual signal; a transform unit configured to set a decoded luminance component of a prediction target block to the same number of samples as that of the chrominance component corresponding to the decoded luminance component of the prediction target block, and generate a luminance reference signal; a specification unit configured to specify pixels of luminance having the minimum and maximum pixel values of the decoded luminance component adjacent to the decoded luminance component of the prediction target block, respectively, output luminance pixel values obtained from the specified pixels of luminance, and output chrominance pixel values obtained from pixels of pigment corresponding to the pixels of luminance; a derivation unit configured to derive a linear prediction parameter from the luminance pixel value, the chrominance pixel value, and a linear prediction model; a chrominance linear prediction unit configured to obtain a chrominance prediction signal by applying the linear prediction model based on the linear prediction parameter to the luminance reference signal; and an addition unit configured to add the chrominance prediction signal and the chrominance residual signal to generate a reconstructed chrominance signal, wherein the derivation unit is configured to set an upper limit for a magnitude of the linear prediction parameter, and the specification unit is configured to set the decoded luminance component adjacent to the decoded luminance component of the prediction target block to the same number of samples as that of the chrominance component corresponding to the decoded luminance component of the prediction target block, and specify the pixels having the minimum and maximum values of the luminance component, respectively.

The second aspect of the present invention is summarized as a moving picture decoding method for decoding encoded data, the moving picture decoding method including: a step A of decoding the encoded data to obtain a chrominance residual signal; a step B of setting a decoded luminance component of a prediction target block to the same number of samples as that of the chrominance component corresponding to the decoded luminance component of the prediction target block and generating a luminance reference signal; a step C of specifying pixels of luminance having the minimum and maximum pixel values of the decoded luminance component adjacent to the decoded luminance component of the prediction target block, respectively, outputting luminance pixel values obtained from the specified pixels of luminance, and outputting chrominance pixel values obtained from pixels of pigment corresponding to the pixels of luminance; a step D of deriving a linear prediction parameter from the luminance pixel value, the chrominance pixel value, and a linear prediction model; a step E of obtaining a chrominance prediction signal by applying the linear prediction model based on the linear prediction parameter to the luminance reference signal; a step F of adding the chrominance prediction signal and the chrominance residual signal to generate a reconstructed chrominance signal; and a step G of setting an upper limit for a magnitude of the linear prediction parameter, wherein in the step C, the decoded luminance component adjacent to the decoded luminance component of the prediction target block is set to the same number of samples as that of the chrominance component corresponding to the decoded luminance component of the prediction target block, and the pixels having the minimum and maximum values of the luminance component are specified respectively.

The third aspect of the present invention is summarized as a program used in a moving picture decoding device configured to decode encoded data, the program causes a computer to execute: a step A of decoding the encoded data to obtain a chrominance residual signal; a step B of setting a decoded luminance component of a prediction target block to the same number of samples as that of the chrominance component corresponding to the decoded luminance component of the prediction target block and generating a luminance reference signal; a step C of specifying pixels of luminance having the minimum and maximum pixel values of the decoded luminance component adjacent to the decoded luminance component of the prediction target block, respectively, outputting luminance pixel values obtained from the specified pixels of luminance, and outputting chrominance pixel values obtained from pixels of pigment corresponding to the pixels of luminance; a step D of deriving a linear prediction parameter from the luminance pixel value, the chrominance pixel value, and a linear prediction model; a step E of obtaining a chrominance prediction signal by applying the linear prediction model based on the linear prediction parameter to the luminance reference signal; a step F of adding the chrominance prediction signal and the chrominance residual signal to generate a reconstructed chrominance signal; and a step G of setting an upper limit for a magnitude of the linear prediction parameter, wherein in the step C, the decoded luminance component adjacent to the decoded luminance component of the prediction target block is set to the same number of samples as that of the chrominance component corresponding to the decoded luminance component of the prediction target block, and the pixels having the minimum and maximum values of the luminance component are specified respectively.

According to the present invention, it is possible to provide a moving picture decoding device, a moving picture encoding device, a moving picture processing system, a moving picture decoding method, and a program capable of reducing a precision (number of bits) of a lookup table and determining the maximum value of an absolute value of a prediction coefficient to reduce a required calculation precision (number of bits required for calculation) to the same degree as the calculation precision of an interpolation filter.

In addition, it is possible to provide a moving picture decoding device, a moving picture encoding device, a moving picture processing system, a moving picture decoding method, and a program capable of determining pixels whose luminance becomes the minimum value and the maximum value without smoothing and completely reducing a smoothing operation even though the number of comparisons is doubled.

DETAILED DESCRIPTION

Hereinafter, embodiments of the present invention will be described with reference to the drawings. Note that the components in the following embodiments can be appropriately replaced with existing components and the like, and various variations including combinations with other existing components are possible. Therefore, the description of the following embodiments does not limit the contents of the invention described in the claims.

First Embodiment

Figure 1:
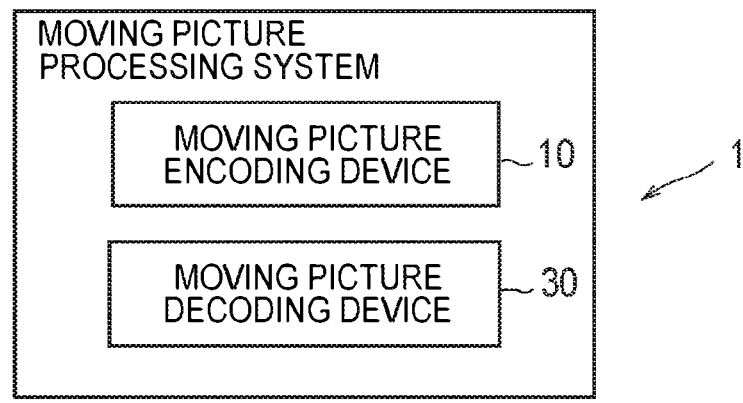
FIG. 1 is a diagram illustrating an example of a configuration of a moving picture processing system 1 according to an embodiment.

FIG. 1 is a diagram illustrating an example of a configuration of a moving picture processing system 1 according to a first embodiment of the present invention.

As illustrated in FIG. 1, a moving picture processing system 1 according to the present embodiment includes a moving picture encoding device 10 that encodes a moving picture to generate encoded data, and a moving picture decoding device 30 that decodes the encoded data generated by the moving picture encoding device 10. The moving picture encoding device 10 and the moving picture decoding device 30 are configured to transmit and receive the above-described encoded data via, for example, a transmission path.

Figure 2:
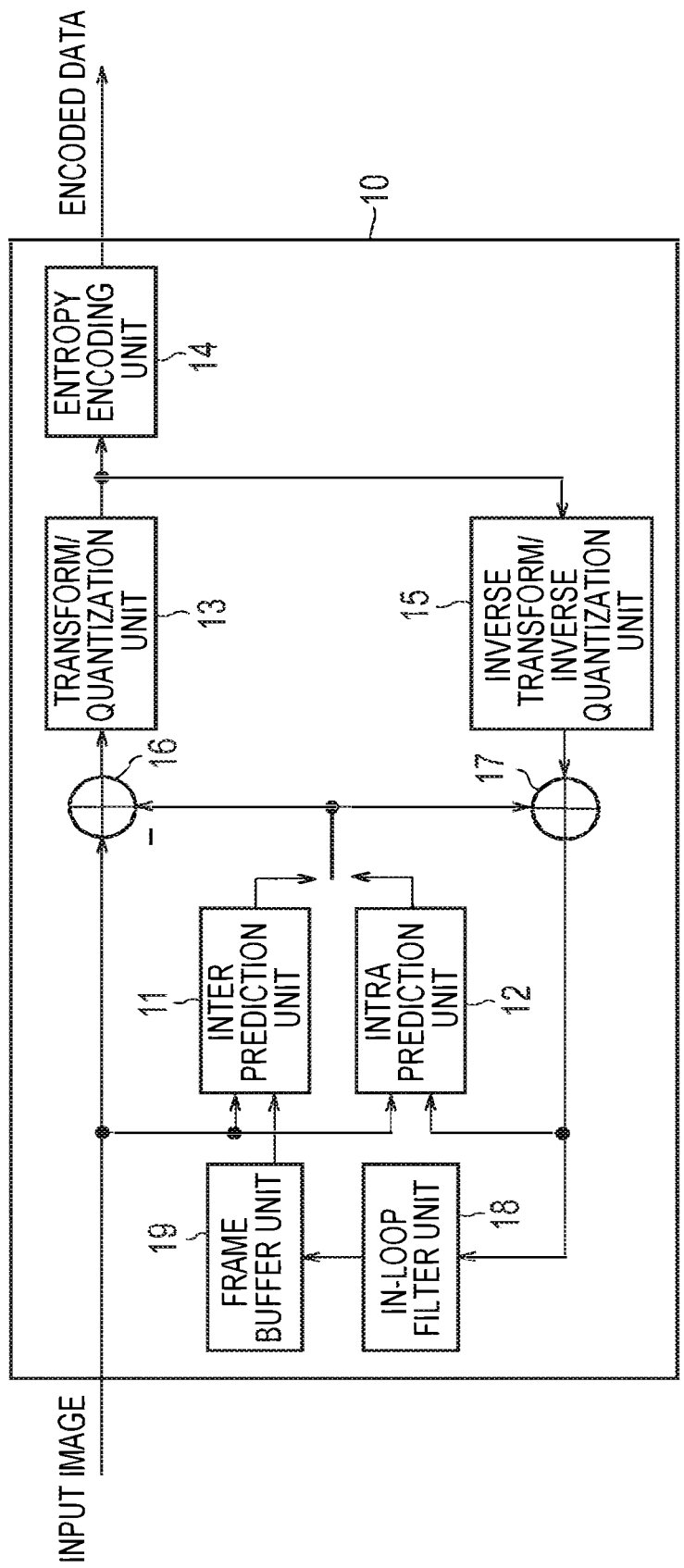
FIG. 2 is a diagram illustrating an example of functional blocks of a moving picture encoding device 10 according to an embodiment.

FIG. 2 is a diagram illustrating an example of functional blocks of the moving picture encoding device 10 according to the present embodiment.

As illustrated in FIG. 2, the moving picture encoding device 10 according to the present embodiment includes an inter prediction unit 11, an intra prediction unit 12, a transform/quantization unit 13, an entropy encoding unit 14, an inverse transform/inverse quantization unit 15, a subtraction unit 16, an addition unit 17, an in-loop filter unit 18, and a frame buffer unit 19.

The inter prediction unit 11 is configured to receive an input image and a locally decoded image after filtering to be described later supplied from the frame buffer unit 19. The inter prediction unit 11 is configured to perform inter prediction using the input image and the locally decoded image after filtering to generate and output an inter predicted image.

The intra prediction unit 12 is configured to receive an input image and a locally decoded image before filtering (reconstructed chrominance signal) to be described later. The intra prediction unit 12 is configured to perform intra prediction using the input image and the locally decoded image before filtering to generate and output an intra predicted image.

Here, the intra predicted image includes a luminance prediction signal and a chrominance prediction signal. Note that the locally decoded image before filtering includes a luminance component and a chrominance component.

The transform/quantization unit 13 is configured to perform orthogonal transform processing on an input residual signal, perform quantization processing on a transform coefficient obtained by the orthogonal transform processing, and output a quantized level value.

The entropy encoding unit 14 is configured to receive the quantized level value, a transform unit (TU) size, and a transform size. The entropy encoding unit 14 is configured to entropy-encode the input signal and output the entropy-encoded signal as encoded data.

The inverse transform/inverse quantization unit 15 is configured to receive the quantized level value. The inverse transform/inverse quantization unit 15 is configured to perform inverse quantization processing on the quantized level value, perform inverse orthogonal transform processing on a transform coefficient obtained by the inverse quantization processing, and output an inverse orthogonal transformed residual signal.

The subtraction unit 16 is configured to receive the input image and the intra predicted image or the inter predicted image, and output a residual signal that is a difference between the two.

The addition unit 17 is configured to receive the residual signal and the intra predicted image or the inter predicted image, and output the locally decoded image before filtering obtained by adding the two.

The in-loop filter unit 18 is configured to receive the locally decoded image before filtering. Here, the locally decoded image before filtering is a signal obtained by adding the prediction image and the inverse orthogonal transformed residual signal.

The in-loop filter unit 18 is configured to perform filtering processing such as a deblocking filter on the locally decoded image before filtering, to generate and output the locally decoded image after filtering.

The frame buffer unit 19 is configured to accumulate the locally decoded image after filtering and appropriately supply the locally decoded image after filtering to the inter prediction unit 11 as the locally decoded image after filtering.

Figure 3:
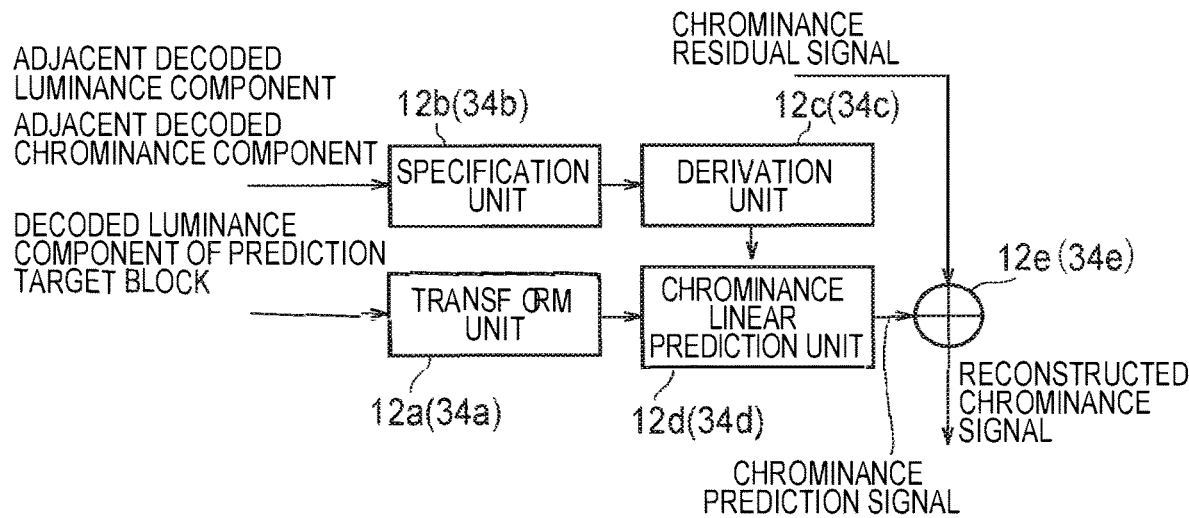
FIG. 3 is a diagram illustrating an example of a function for performing chrominance intra prediction in an intra prediction unit 12 of the moving picture encoding device 10 according to an embodiment.

FIG. 3 is a diagram illustrating an example of a function for predicting a chrominance component from a reconstructed luminance component (decoded luminance component of a prediction target block and decoded luminance component adjacent to the decoded luminance component of the prediction target block) in the intra prediction unit 12 of the moving picture encoding device 10 according to the present embodiment.

As illustrated in FIG. 3, the function of performing the chrominance intra prediction includes a transform unit 12*a*, a specification unit 12*b*, a derivation unit 12*c*, a chrominance linear prediction unit 12*d*, and an addition unit 12*e*. Here, whether or not to apply the chrominance intra prediction is determined by a chrominance intra prediction mode subjected to the entropy decoding.

The transform unit 12*a* is configured to set the decoded luminance component of the prediction target block (included in the locally decoded image before filtering) to the same number of samples as that the chrominance components corresponding to the decoded luminance component of the prediction target block and output a luminance reference signal. Here, a 6-tap filter may be applied to the transform of the number of samples.

In addition, the decoded luminance component of the prediction target block is input from the addition unit 17 to the transform unit 12*a*.

The specification unit 12b is configured to specify pixels of luminance having the minimum and maximum pixel values of the decoded luminance component (included in the locally decoded image before filtering) adjacent to the decoded luminance component of the prediction target block, respectively. In addition, the specification unit 12b is configured to output luminance pixel values of the specified pixels of luminance and chrominance pixel values of pixels of chrominance corresponding to the specified pixels of luminance.

Here, when the number of samples of the luminance component and the number of samples of the chrominance component are different, the pixel of the luminance and the pixel of the chrominance may not correspond one-to-one. However, since it can be assumed that the number of samples of the luminance component is larger than the number of samples of the chrominance component, the pixel of the chrominance corresponding to the pixel of the luminance can be uniquely determined.

The specification unit 12b receives, from the addition unit 17, a decoded luminance component adjacent to the decoded luminance component of the prediction target block and a decoded chrominance component adjacent to the decoded luminance component of the prediction target block.

The derivation unit 12c is configured to derive a linear prediction parameter for inputting the minimum and maximum pixel values of the luminance component, the pixel values of the corresponding chrominance, and a linear prediction model.

The chrominance linear prediction unit 12d is configured to output a chrominance prediction signal by applying the linear prediction model based on the linear prediction parameter to the luminance reference signal.

The addition unit 12e is configured to generate a reconstructed chrominance signal by adding the chrominance prediction signal and the chrominance residual signal.

Figure 4:
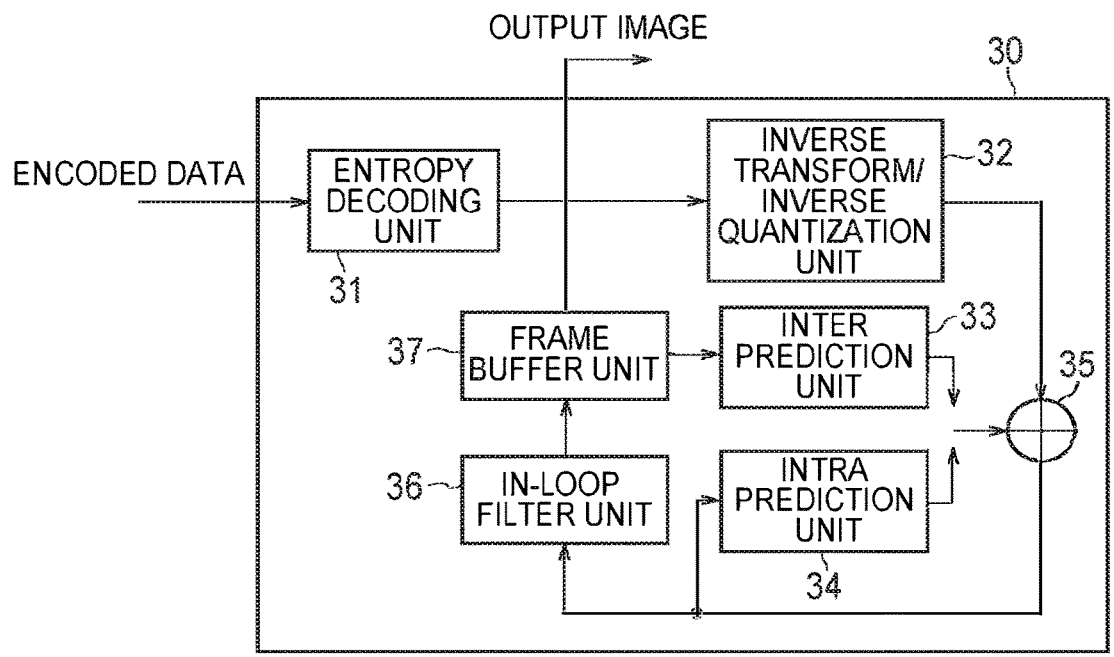
FIG. 4 is a diagram illustrating an example of functional blocks of a moving picture decoding device 30 according to an embodiment.

FIG. 4 is a diagram illustrating an example of functional blocks of the moving picture decoding device 30 according to the present embodiment.

As illustrated in FIG. 4, the moving picture decoding device 30 according to the present embodiment includes an entropy decoding unit 31, an inverse transform/inverse quantization unit 32, an inter prediction unit 33, an intra prediction unit 34, an addition unit 35, an in-loop filter unit 36, and a frame buffer unit 37.

The entropy decoding unit 31 is configured to receive encoded data. The entropy decoding unit 31 is configured to perform entropy decoding of the encoded data, and derive and output a quantization coefficient level value and a chrominance intra prediction mode generated by the moving picture encoding device 10.

The inverse transform/inverse quantization unit 32 is configured to receive the quantization coefficient level value. The inverse transform/inverse quantization unit 32 is configured to perform inverse quantization processing on the quantization coefficient level value, perform inverse orthogonal transform processing on a result obtained by the inverse quantization processing, and output a residual signal (including a luminance residual signal and a chrominance residual signal).

The inter prediction unit 33 is configured to receive a locally decoded image after filtering to be described later, supplied from the frame buffer unit 37. The inter prediction unit 33 is configured to perform inter prediction using the locally decoded image after filtering to generate and output an inter predicted image.

The intra prediction unit 34 is configured to receive a locally decoded image before filtering. Here, the locally decoded image before filtering is a signal obtained by adding the residual signal and the prediction image, and the prediction image is a prediction image calculated by a prediction method that is expected to have the highest encoding performance obtained by entropy decoding, among the inter predicted image and the intra predicted image.

Note that the intra prediction unit 34 is configured to perform intra prediction using the locally decoded image before filtering to generate and output the intra predicted image. The addition unit 35 is configured to receive the residual signal and the intra predicted image or the inter predicted image, and output a locally decoded image before filtering obtained by adding the two.

The in-loop filter unit 36 is configured to receive the locally decoded image before filtering. The in-loop filter unit 36 is configured to apply an in-loop filter such as a deblocking filter to the locally decoded image before filtering and output the locally decoded image after filtering.

The frame buffer unit 37 is configured to accumulate the locally decoded image after filtering, appropriately supply the locally decoded image after filtering to the inter prediction unit 33 as the locally decoded image after filtering, and output the locally decoded image after filtering as the decoded image.

FIG. 3 is a diagram illustrating an example of a function for predicting a chrominance component from a reconstructed luminance component in the intra prediction unit 34 of the moving picture decoding device 30 according to the present embodiment.

As illustrated in FIG. 3, the function of performing the chrominance intra prediction includes a transform unit 34a, a specification unit 34b, a derivation unit 34c, a chrominance linear prediction unit 34d, and an addition unit 34e. Note that each function is the same as the function in the moving picture encoding device 10, and thus detailed description is omitted.

Hereinafter, an operation of predicting a chrominance component from a reconstructed luminance component in the moving picture decoding device 30 according to the present embodiment will be described with reference to FIG. 5.

Figure 5:
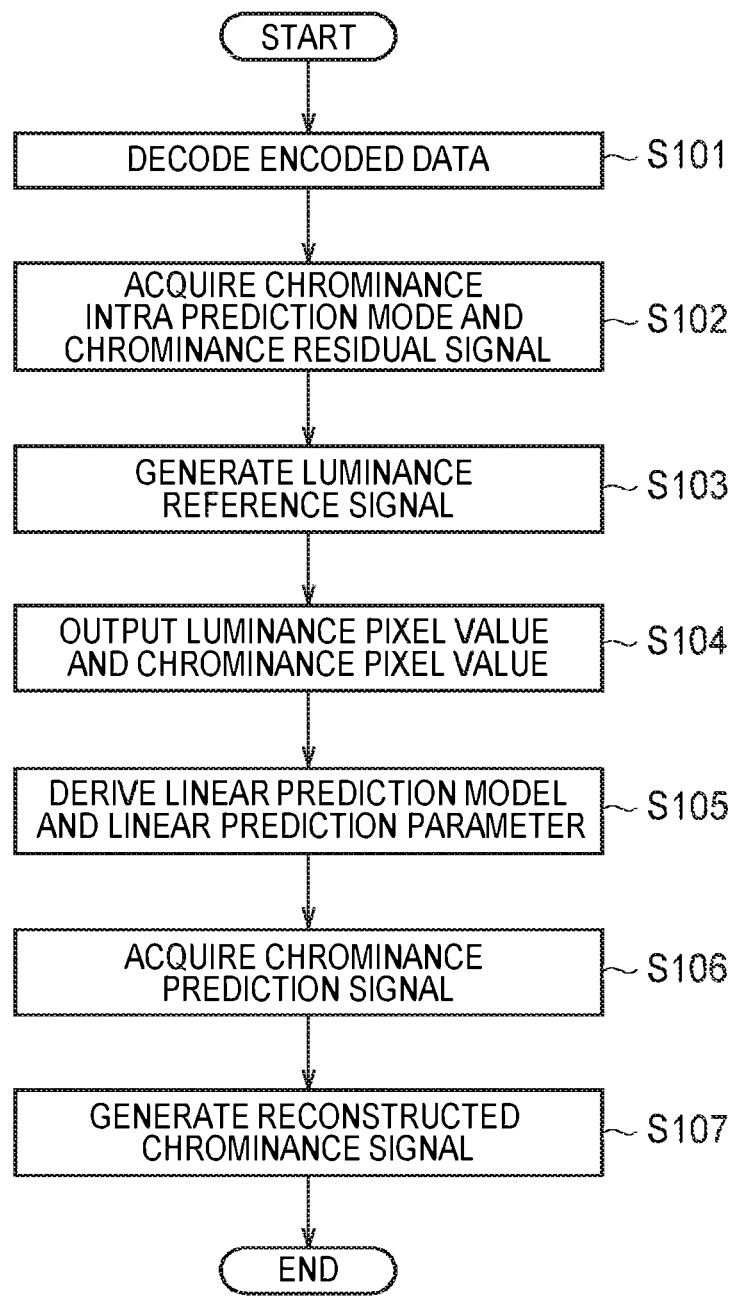
FIG. 5 is a flowchart illustrating an example of an operation of the moving picture decoding device 30 according to an embodiment.
Figure 6:
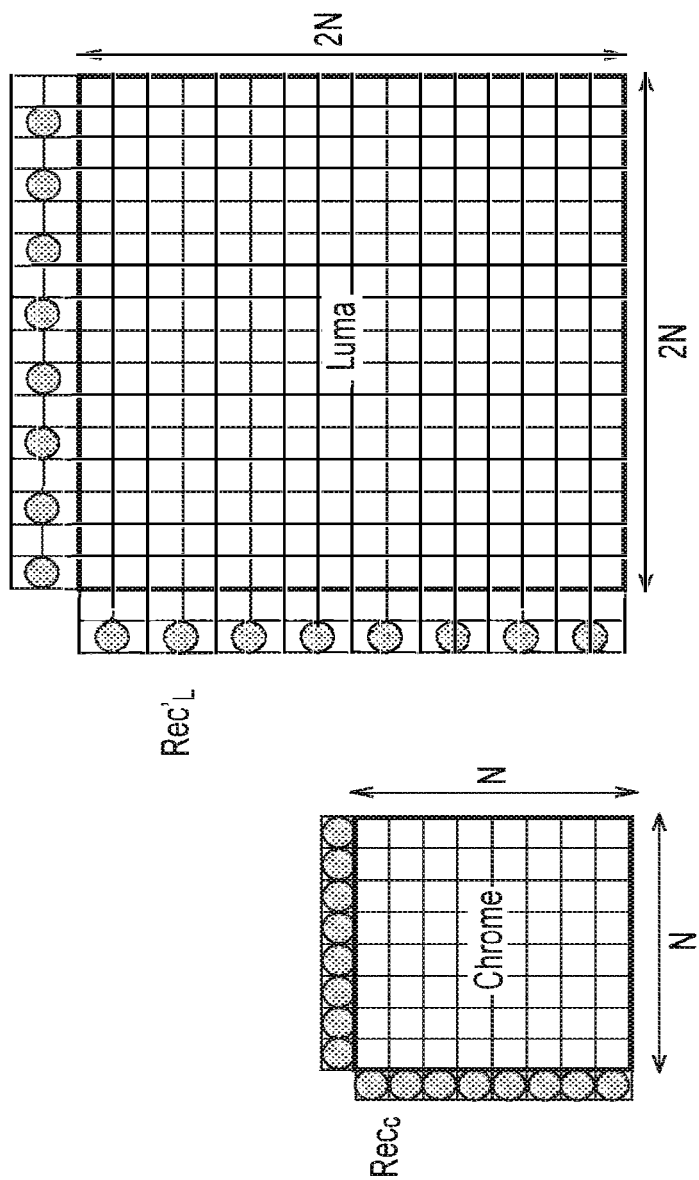
FIG. 6 is a diagram for describing a conventional technique.

As illustrated in FIG. 5, the moving picture decoding device 30 decodes the encoded data in step S101, and acquires the chrominance intra prediction mode and the chrominance residual signal in step S102.

In step S103, the moving picture decoding device 30 sets the decoded luminance component of the prediction target block to the same number of samples as that of the chrominance components corresponding to the decoded luminance component of the prediction target block and generates a luminance reference signal.

In step S104, the moving picture decoding device 30 specifies the pixels of luminance having the minimum and maximum pixel values of the decoded luminance component adjacent to the decoded luminance component of the prediction target block, respectively, and outputs luminance pixel values of the specified pixels of luminance and chrominance pixel values of pixels of pigment corresponding to the pixels of luminance.

In step S105, the moving picture decoding device 30 derives a linear prediction parameter from the luminance pixel value, the chrominance pixel value, and a linear prediction model.

In step S106, the moving picture decoding device 30 acquires a chrominance prediction signal by applying the linear prediction model based on the linear prediction parameter to the luminance reference signal.

In step S107, the moving picture decoding device 30 generates a reconstructed chrominance signal by adding the chrominance prediction signal and the chrominance residual signal.

According to the moving picture encoding device 10 and the moving picture decoding device 30 according to the present embodiment, since the specification unit 12b/34b specifies the minimum and maximum pixel values without smoothing adjacent decoded luminance components, the number of shift operations can be reduced, and since the adjacent decoded luminance components are specified without applying the conventional 6-tap filter at all, the number of addition operations can be further reduced.

Second Embodiment

Hereinafter, the moving picture encoding device 10 and the moving picture decoding device 30 according to a second embodiment of the present invention will be described focusing on differences from the moving picture encoding device 10 and the moving picture decoding device 30 according to the above-described first embodiment.

In the present embodiment, the derivation unit 12c/34c is configured to apply shift processing to the number of bits of the linear prediction parameter to be output, in order to make the same number of bits as that of the interpolation operation in a motion compensation prediction in the inter prediction unit 33 of the moving picture decoding device 30.

Specifically, the derivation unit 12c/34c is configured to reduce the number of bits in a fixed-point representation of the lookup table when performing division by the difference between the maximum value and the minimum value of the luminance value using the lookup table. For example, the number of bits of the lookup table value may be 8 bits.

In addition, the derivation unit 12c/34c divides the difference between the maximum value and the minimum value of the chrominance values, and clips the maximum value of the difference to a predetermined range. For example, the derivation unit 12c/34c may be from −256 to 255, which is a range of a signed 9-bit integer.

According to the moving picture encoding device 10 and the moving picture decoding device 30 according to the present embodiment, since the specification unit 12b/34b specifies the minimum and maximum pixel values without smoothing adjacent decoded luminance components, the number of shift operations can be reduced, and since the adjacent decoded luminance components are specified without applying the conventional 6-tap filter at all, the number of addition operations can be further reduced. Further, similarly to the interpolation operation in the inter prediction, the number of bits of a multiplier becomes 17 bits, and the design cost of the multiplier can be reduced.

Third Embodiment

Hereinafter, the moving picture encoding device 10 and the moving picture decoding device 30 according to a third embodiment of the present invention will be described focusing on differences from the moving picture encoding device 10 and the moving picture decoding device 30 according to the above-described first and second embodiment.

In the present embodiment, the derivation unit 12c/34c is configured to set an upper limit for the magnitude of the linear prediction parameter.

For example, the derivation unit 12c/34c may be configured to apply a clip operation and a shift operation to the linear prediction parameter.

For example, the linear prediction parameter is composed of a sign 1 bit, an integer part 3 bits, and a fixed point part 8 bits so as to be a signed 12-bit fixed point. As a result, the chrominance linear prediction units 12d and 33d may be configured such that the number of bits of a product-sum operation unit is 17 bits, similarly to the number of bits of a product-sum operation unit of the interpolation operation.

In addition, the linear prediction parameter may be configured to be a signed 7-bit fixed point. As a result, the chrominance linear prediction units 12d and 33d may be configured such that the number of bits of the multiplier is 17 bits, similarly to the number of bits of the multiplier for the interpolation operation.

In addition, the linear prediction parameter may be configured to be a signed 7-bit floating point. As a result, the chrominance linear prediction units 12d and 33d may be configured such that the number of bits of the multiplier is a combination of 17 bits and the shift operation, similarly to the number of bits of the multiplier for the interpolation operation.

According to the moving picture encoding device 10 and the moving picture decoding device 30 according to the present embodiment, even when the fluctuation in the luminance component is small, it is possible to suppress the chrominance signal from being linearly predicted beyond the range of the input signal because the linear prediction parameter is suppressed to a certain value or less.

Fourth Embodiment

Hereinafter, the moving picture encoding device 10 and the moving picture decoding device 30 according to a fourth embodiment of the present invention will be described focusing on differences from the moving picture encoding device 10 and the moving picture decoding device 30 according to the above-described first to third embodiments.

In the present embodiment, the specification unit 12b/34b is configured to set the decoded luminance component to the same number of samples as that of the chrominance components corresponding to the decoded luminance component and generate the luminance reference signal.

Specifically, the specification unit 12b/34b may be configured to apply a horizontal 3-tap smoothing filter to an upper reference luminance component and apply a vertical 2-tap smoothing filter to a left adjacent reference luminance component.

According to the moving picture encoding device 10 and the moving picture decoding device 30 according to the present embodiment, noise in adjacent reference luminance components can be suppressed, and prediction precision can be improved.

What is claimed is:

1. A moving picture decoder configured to decode encoded data, comprising a memory comprising programmed instructions stored in the memory and a processor configured to be capable of executing the programmed instructions stored in the memory to:

decode the encoded data to obtain a chrominance residual signal;

set a decoded luminance component of a prediction target block to a same number of samples as that of a chrominance component corresponding to the decoded luminance component of the prediction target block, and generate a luminance reference signal;

specify pixels of luminance having a minimum and maximum pixel values of the decoded luminance component adjacent to the decoded luminance component of the prediction target block, respectively, output luminance pixel values obtained from the specified pixels of luminance, and output chrominance pixel values obtained from pixels of pigment corresponding to the pixels of luminance;

derive a linear prediction parameter from the luminance pixel value, the chrominance pixel value, and a linear prediction model;

obtain a chrominance prediction signal by applying the linear prediction model based on the linear prediction parameter to the luminance reference signal; and add the chrominance prediction signal and the chrominance residual signal to generate a reconstructed chrominance signal; wherein a maximum value of a difference between a maximum value and a minimum value of the chrominance pixel value is clipped to a predetermined range, the decoded luminance component adjacent to the decoded luminance component of the prediction target block is set to the same number of samples as that of the chrominance component corresponding to the decoded luminance component of the prediction target block, the pixels having the minimum and maximum values of a luminance component are specified, respectively, and the linear prediction parameter being derived by shift processing are specified, respectively.

2. A moving picture decoding method for decoding encoded data, the moving picture decoding method comprising:

a step A of decoding the encoded data to obtain a chrominance residual signal;

a step B of setting a decoded luminance component of a prediction target block to a same number of samples as that of a chrominance component corresponding to the decoded luminance component of the prediction target block and generating a luminance reference signal;

a step C of specifying pixels of luminance having a minimum and maximum pixel values of the decoded luminance component adjacent to the decoded luminance component of the prediction target block, respectively, outputting luminance pixel values obtained from the specified pixels of luminance, and outputting chrominance pixel values obtained from pixels of pigment corresponding to the pixels of luminance;

a step D of deriving a linear prediction parameter from the luminance pixel value, the chrominance pixel value, and a linear prediction model;

a step E of obtaining a chrominance prediction signal by applying the linear prediction model based on the linear prediction parameter to the luminance reference signal;

a step F of adding the chrominance prediction signal and the chrominance residual signal to generate a reconstructed chrominance signal; and a step G of clipping a maximum value of a difference between a maximum value and a minimum value of the chrominance pixel value to a predetermined range, wherein in the step C, the decoded luminance component adjacent to the decoded luminance component of the prediction target block is set to the same number of samples as that of the chrominance component corresponding to the decoded luminance component of the prediction target block, the pixels having the minimum and maximum values of a luminance component are specified, respectively, and the linear prediction parameter being derived by shift processing are specified, respectively.

3. A non-transitory computer readable medium having stored thereon instructions for decoding encoded data, comprising machine executable code which when executed by at least one machine causes the machine to perform:

a step A of decoding the encoded data to obtain a chrominance residual signal;

a step B of setting a decoded luminance component of a prediction target block to a same number of samples as that of a chrominance component corresponding to the decoded luminance component of the prediction target block and generating a luminance reference signal;

a step C of specifying pixels of luminance having a minimum and maximum pixel values of the decoded luminance component adjacent to the decoded luminance component of the prediction target block, respectively, outputting luminance pixel values obtained from the specified pixels of luminance, and outputting chrominance pixel values obtained from pixels of pigment corresponding to the pixels of luminance;

a step D of deriving a linear prediction parameter from the luminance pixel value, the chrominance pixel value, and a linear prediction model;

a step E of obtaining a chrominance prediction signal by applying the linear prediction model based on the linear prediction parameter to the luminance reference signal;

a step F of adding the chrominance prediction signal and the chrominance residual signal to generate a reconstructed chrominance signal; and a step G of clipping a maximum value of a difference between a maximum value and a minimum value of the chrominance pixel value to a predetermined range, wherein in the step C, the decoded luminance component adjacent to the decoded luminance component of the prediction target block is set to the same number of samples as that of the chrominance component corresponding to the decoded luminance component of the prediction target block, the pixels having the minimum and maximum values of a luminance component are specified, respectively, and the linear prediction parameter being derived by shift processing are specified, respectively.

* * * * *

UNITED STATES PATENT AND TRADEMARK OFFICE
CERTIFICATE OF CORRECTION

| | | |
|---|---|---|
| PATENT NO. | : 11,871,021 B2 | Page 1 of 1 |
| APPLICATION NO. | : 17/873669 | |
| DATED | : January 9, 2024 | |
| INVENTOR(S) | : Kei Kawamura and Sei Naito | |

It is certified that error appears in the above-identified patent and that said Letters Patent is hereby corrected as shown below:

In the Claims

Claim 1: (Column 11, Line 7) replace "pigment" with "chrominance"

Claim 2: (Column 11, Lines 46-47) replace "pigment" with "chrominance"

Claim 3: (Column 12, Lines 31-32) replace "pigment" with "chrominance"

Signed and Sealed this
Fourteenth Day of January, 2025

Derrick Brent
*Acting Director of the United States Patent and Trademark Office*